(12) United States Patent
Golaup et al.

(10) Patent No.: US 9,609,516 B2
(45) Date of Patent: Mar. 28, 2017

(54) CONTENT CONTROL IN TELECOMMUNICATIONS NETWORKS

(71) Applicant: VODAFONE IP LICENSING LIMITED, Berkshire (GB)

(72) Inventors: Assen Golaup, Berkshire (GB); Peter Howard, Berkshire (GB); Leo Patanapongibul, Berkshire (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 119 days.

(21) Appl. No.: 14/396,896

(22) PCT Filed: Apr. 24, 2013

(86) PCT No.: PCT/GB2013/051034

§ 371 (c)(1),
(2) Date: Oct. 24, 2014

(87) PCT Pub. No.: WO2013/160673

PCT Pub. Date: Oct. 31, 2013

(65) Prior Publication Data

US 2015/0105049 A1    Apr. 16, 2015

(30) Foreign Application Priority Data

Apr. 24, 2012    (GB) .................................. 1207199.9

(51) Int. Cl.
*H04M 1/66* (2006.01)
*H04W 12/08* (2009.01)
(Continued)

(52) U.S. Cl.
CPC ......... *H04W 12/08* (2013.01); *H04L 63/0892* (2013.01); *H04L 63/205* (2013.01);
(Continued)

(58) Field of Classification Search
CPC ....... H04W 12/06; H04W 4/24; H04W 4/003; H04W 4/001; H04W 8/06; H04W 8/04;
(Continued)

(56) References Cited

U.S. PATENT DOCUMENTS

2009/0300726 A1* 12/2009 Qian .................... H04W 12/06
726/4
2010/0169950 A1   7/2010 Matti et al.
(Continued)

FOREIGN PATENT DOCUMENTS

EP       2 086 180        8/2009

OTHER PUBLICATIONS

International Search Report dated Jul. 4, 2013 in PCT/GB2013/051034.
(Continued)

*Primary Examiner* — Fred Casca
(74) *Attorney, Agent, or Firm* — B. Aaron Schulman, Esq.; Nicholas Trenkle; Stites & Harbison, PLLC

(57) ABSTRACT

A telecommunications network including: a mobile device (10); a home network (12) with which the mobile device (10) user has a subscription including content preferences, the home network (12) including a content preference store (94) for storing the content preferences, a policy provisioning server (9) for indicating content preferences to mobile device (10) and home authenticating means (13) for performing authentication of the mobile device (10); and a further network (38) having at least one access point (11) with which the mobile device (10) can temporarily communicate and further authenticating means (42) for controlling registration of the mobile device (10) with the access point (11); wherein: the further authentication means (42) is operable to communicate with the home authentication means (12) to perform an authentication process for the
(Continued)

mobile device (10) when the mobile device (10) connects to the access point (11), which authentication process accesses data from the content preference store (94) storing the user content preferences, determines if the further network (38) can satisfy the content preferences, and controls registration of the mobile device (10) with the access point (11) in dependence upon whether the further network (38) can satisfy the content preferences of the user. The mobile device (10) may include a store (36) for storing the user content preferences provisioned by a policy server (9), and registration control means (37) operable to generate a content query to the further network (38), and to analyze a response to the content query so as to determine if the further network (38) can satisfy the content preferences and to enable registration with the access point (11) in dependence thereon.

14 Claims, 10 Drawing Sheets

(51) Int. Cl.
 H04W 4/24 (2009.01)
 H04W 4/00 (2009.01)
 H04L 29/06 (2006.01)
 H04W 12/06 (2009.01)
 H04W 8/18 (2009.01)
(52) U.S. Cl.
 CPC ............ *H04W 4/001* (2013.01); *H04W 4/003* (2013.01); *H04W 4/24* (2013.01); *H04W 8/18* (2013.01); *H04W 12/06* (2013.01)

(58) Field of Classification Search
 CPC ....... H04W 48/18; H04W 8/26; H04W 60/00; H04W 8/183; H04W 84/12; H04W 8/12; H04W 72/04; H04W 36/08; H04W 60/005; H04W 60/06
 USPC .......... 455/406, 411, 433, 432.1, 432.3, 434, 455/436, 456.1, 404.1, 418, 426.1, 435.1, 455/456.2, 408, 410, 414.1, 417, 419, 455/435.2
 See application file for complete search history.

(56) References Cited

U.S. PATENT DOCUMENTS

2011/0170530 A1   7/2011 Akiyoshi
2013/0070739 A1*  3/2013 McCann ............... H04W 48/16
                                                  370/338

OTHER PUBLICATIONS www.networkworld.com: "802.11u and Hotspot 2.0 promise Wi-Fi users a cellular-like experience", Internet Citation, Sep. 7, 2011, pp. 1-3, XP002695503.
Alcatel Lucent: "Wi-Fi Roaming—Building on ANDSF and Hotspot 2.0", Internet Citation, Feb. 27, 2012, pp. 1-45, XP002677915.
3GPP: "$3^{rd}$ Generation Partnership Project: Technical Specification Group Services and System Aspects: 3GPP System Architecture Evolution (SAE); Security aspects of non-3GPP accesses (Release 11)", 3GPP Draft; Draft_33402-B31, $3^{rd}$ Generation Partnership Project (3GPP), Mobile Competence Centre; 650, Route Des Lucioles; F006921 Sophia-Antipolis Cedex, France Mar. 15, 2012, XP050633910, Section 6.

* cited by examiner

CONTENT CONTROL IN TELECOMMUNICATIONS NETWORKS

TECHNICAL FIELD

The present invention relates to a telecommunications network including a mobile device; a home network with which the mobile device user has a subscription including user content delivery preferences, the home network including a content delivery preference store for storing the user content delivery preferences and home authenticating means for controlling registration of the mobile device with the home network; and a further network having at least one access point with which the mobile device can potentially temporarily register and further authenticating means for controlling registration of the mobile device with the access point. The present invention also relates to a corresponding method and a mobile device.

BACKGROUND TO THE INVENTION

The authorities have identified a growing trend of children accessing inappropriate content on WLAN networks, especially using devices like mobile phones and tablets. WLAN Service Providers are being urged to implement adult content filtering in their network to protect children from inappropriate content. Moreover, mobile device manufacturers and mobile operators have been called upon to do more to advertise the threat of adult content access by children on WLAN networks and to provide parents with tools to protect their children from accessing inappropriate content. Currently, some cellular (mobile) network operators implement adult content filtering in their network. However, WLAN service providers generally do not offer adult content filtering capabilities today in their networks.

A mobile device user may have a subscription with a cellular (mobile) network operator or a primary WLAN service provider, and may specify their content filtering preferences with that cellular (mobile) network operator or primary WLAN service provider.

A cellular (mobile) network operator or primary WLAN service provider selling a WLAN subscription to a subscriber can provision the mobile device with a roaming list of allowed roaming partners to which that subscriber can roam. This means that the mobile device will use its SIM or USIM credentials to authenticate against those WLAN service providers. The subscription may contain a profile indicating whether content filtering is activated or not for this subscription.

One approach for the cellular (mobile) network operator or primary WLAN service provider to ensure that the user only accesses WLAN networks with adult content filtering in place is to define the roaming list to only include WLAN service providers that implement adult content filtering in their Wide Area Networks (WAN). One option is that adult content filtering support is negotiated as part of the contractual agreement between roaming partners. However, considering that the subscriber population requiring adult content filtering is assumed to be relatively small, it is likely that commercial decisions will be made not only on the basis of adult content filtering support. This means that there will be a possibility for users with subscriptions with adult content filtering restrictions to still gain access to a network with no adult content filtering in place. The only way the home cellular (mobile) network operator or primary WLAN service provider can prevent access to a roaming partner network is to build up a shortlist of networks with adult content filtering and restrict access to those networks for subscriptions where adult content filtering is active. Considering that the number of roaming partners of the operator can change in a relatively dynamic way and that a cellular (mobile) network operator or primary WLAN service provider can enter into international roaming relationships where the level of support for adult content filtering is more difficult to assess, it is a big burden for the home cellular (mobile) network operator or primary WLAN service provider to pick roaming partners for devices with subscriptions which have adult content filtering activated in their profile. This assessment can be relieved if a regulatory framework is in place that defines the criteria which must be satisfied for a local network to claim that it supports Adult Content Filtering. The provision of a restricted roaming partner list (only roaming partners supporting adult content filtering) is also not a secure mechanism as the user may always find means to modify the list and hence get access to network without adult content filtering. It is also important that customers with no adult content filtering in their subscriptions are able to access networks where adult content filtering is not in place if they want to avoid the irritation of content (sometimes even not actual adult content) from being blocked by an over restrictive adult content filtering engine.

One approach would be to implement content filtering on mobile devices. However, the effectiveness of the UE based filtering is limited by processing power on mobile devices, the reluctance of device manufacturers to support such functionalities on the device, the difficulty of maintaining up-to-date blacklists and adult content filtering policies on the device. It is also likely that the user will find a way to deactivate the content filtering on the device.

SUMMARY OF THE INVENTION

In one aspect, the present invention provides a telecommunications network including:
a mobile device;
a home network with which the mobile device user has a subscription including content preferences, the home network including a content preference store for storing the content preferences, and home authenticating means for performing authentication of the mobile device; and
a further network having at least one access point with which the mobile device can potentially temporarily register and further authenticating means for controlling registration of the mobile device with the access point;
wherein:
the further network is connected to the home network for communication therebetween; and
the further authentication means is operable to communicate with the home authentication means to perform an authentication process for the mobile device when the mobile device connects to the access point, which authentication process accesses data from the content preference store storing the user content preferences (e.g. HLR/HSS subscription database), determines if the further network can satisfy the content preferences, and controls registration of the mobile device with the access point in dependence upon whether the further network can satisfy the content preferences of the user.

The "home" telecommunications network may be the network with which the mobile terminal is usually registered. The further telecommunications network may be a "roamed" mobile telecommunications network with which the mobile device may be temporarily registered, a communication link existing between the home network and the roamed network in order to allow data exchange therebetween. An agreement may exist between that home network and the roamed network which allows data to be shared therebetween in order to allow appropriate routing of the calls and data (e.g. content) and so that the user of the mobile device can be levied a charge in dependence upon costs incurred by both the home network and the roamed network in handling the call or data. The home network and the roamed network may cover different geographical areas (e.g. different countries) or may have overlapping coverage areas. For example, the roamed network may provide relatively short range access points that have a limited coverage area but that allow relatively fast data speeds.

The "home" telecommunications network and the further ("roamed") telecommunications network may be separately operated and/or separately owned, geographically separated. An agreement may exist between the two networks to allow the subscriber of the "home" telecommunications network to obtain service through the further ("roamed") telecommunications network—for example, in exchange for a payment. The arrangement may allow the authentication credentials used for authenticating the mobile device with the "home" telecommunications network to also be used to authenticate the mobile device when it is attached to the access point of the further ("roamed") telecommunications network.

The home network and the further network may be any type of communication network. They may be the same type of communication network or respective different types of communication network.

The home network may be a cellular network, such as a 2G, 3G or 4G network.

The home network may be a WLAN network.

The further network may be a WLAN network. The access point may be a WLAN access point.

The further network may be a cellular network. The access point may be a base station, such as a BTS/BSC (2G), NodeB (3G) or an eNodeB (4G).

The further network will typically include a plurality of the access points.

The telecommunication network may comprise a plurality of further networks.

The authentication process may include sending a request by an authenticator (typically the WLAN access point) to the authentication server and analysing the response from the server to determine if it is as expected before granting access to use the WLAN network. The authentication framework may be according to the Extensible Authentication Protocol (EAP) and includes variants such as EAP-SIM and EAP-AKA/EAP-AKA' when SIM/USIM credentials are used. The EAP-SIM/AKA mechanism is an extension of the basic SIM challenge and response authentication process defined by ETSI standards in order to enable mutual authentication. The authentication process may include the access point (e.g. WLAN authenticator) sending an authentication request to the further authentication means, after receiving communication from the mobile device, the (e.g. further) authentication means performing a challenge/response procedure to authenticate the mobile device and the access point/WLAN authenticator receiving a response from the (e.g. further) authentication means, which is forwarded to the mobile device, with the access point/WLAN authenticator and mobile device analysing the response to determine if the response is as expected.

The embodiments of this invention provide two mechanisms to reduce the risk of users with adult content filtering subscriptions from accessing, e.g., WLAN service providers with no adult content filtering in place and also enable subscribers with no subscription restrictions for adult content filtering to preferentially choose, e.g., WLAN networks without adult content filtering.

This embodiment provides two mechanisms to ensure that a mobile device with a subscription profile indicating adult content filtering is required can only access a visited WLAN service provider network if that network supports the appropriate level of adult content filtering or alternatively for a mobile device with a subscription profile indicating that networks without adult content filtering are preferred to be able to preferentially access such networks:

1) Mechanism based on, e.g., IEEE 802.11u ANQP (Access Network Query Protocol) which allows a device (which is aware that it can only access a network with appropriate level of content filtering activated or that it should preferentially access networks without adult content filtering) to query a, e.g., WLAN Access Point (AP) for the support of adult content filtering by the wide area network (WAN) to which the AP is connected and through which the user's traffic will be routed.

2) Mechanism based on handshake protocol between proxy AAA (Authentication, Authorisation and Accounting) server and Home AAA server to only successfully grant access to the user if the roaming service provider WAN supports adult content filtering as per the user subscription.

Mechanisms (1) and (2) can be used independently or together. In particular mechanism (1) has the advantage compared to mechanism (2) that the user device can abort the association with the AP at an earlier stage if the visited network does not support the appropriate level of content filtering. However, mechanism (1) has the disadvantage that compared to mechanism (2) the user device can be tampered with to circumvent content filtering. Using mechanisms (1) and (2) together provides the early abort advantage without the tampering threat.

According to the first embodiment of the invention, the mobile device of a subscriber which has a subscription with adult content filtering activated or indication of preference to access networks without adult content filtering will make an, e.g., ANQP query to the access point to request information on whether adult content filtering is supported in the network and an, e.g., ANQP server will respond with appropriate information on the support of adult content filtering and level of adult content filtering supported. It is assumed that the mobile device is made aware of the adult content filtering element of the subscription via the operator policy information sent to the mobile device for that specific user, e.g., via OMA DM (Open Mobile Alliance Device Management) SOAP-XML (Simple Objection Access Protocol-Extensible Markup Language).

A second embodiment of the invention provides mechanisms based on a handshake between a Proxy AAA server and a Home AAA server for preventing a mobile device with a subscription with adult content filtering active to access a network without adult content filtering support. According to these mechanisms, the home AAA server or proxy AAA server is responsible for preventing a mobile device with a subscription with adult content filtering active to access a network without adult content filtering support.

In a first option of the second embodiment the home authentication means is operable to access the content preference store storing the user content delivery preferences (e.g. HLR/HSS subscription database) and to send a query to the further authentication means to determine if the further network is able to satisfy the user content preferences, wherein the further authentication means is operable to respond to the home authentication means with an indication of the content capabilities of the further network, wherein the home authentication means is operable to determine if the further network can satisfy the content delivery preferences and to instruct the further authenticating means to allow registration of the mobile device with the access point in dependence thereon. The invention also provides a method corresponding to this option.

In a second option of the second embodiment the further authentication means is operable to send an authentication request to the home authentication means and an indication of the content capabilities of the further network, the home authentication means is operable to access the content preference store storing the user content preferences (e.g. HLR/HSS subscription database), to determine if the further network can satisfy the content preferences according to the content capabilities of the further network, and to instruct the further authenticating means to allow registration of the mobile device with the access point in dependence thereon. The invention also provides a method corresponding to this option.

In a third option of the second embodiment the home authentication means is operable to access the content preference store storing the content preferences (e.g. HLR/HSS subscription database) and to report the user content preferences to the further authentication means, and the further authentication means is operable to determine if the further network can satisfy the content preferences and to allow registration of the mobile device with the access point in dependence thereon. The invention also provides a method corresponding to this option.

When the first embodiment is combined with the second embodiment the mobile device includes: a store for storing the user content preferences, and registration control means operable to generate a content query to the further network, and to analyse a response to the content query so as to determine if the further network can satisfy the content preferences and to enable registration with the access point in dependence thereon.

According to the first embodiment, a mobile device for use in a telecommunications network includes a home network with which the mobile device user has a subscription including content preferences, and a further network having at least one access point with which the mobile device can potentially temporarily register; wherein the mobile device includes:
  a store for storing the user content delivery preferences, and
  registration control means operable to generate a content query to the further network (38), and to analyse a response to the content query so as to determine if the further network (38) can satisfy the content preferences and to enable registration with the access point (11) in dependence thereon.

The invention also provides a network including such a mobile device.

The home network may include means operable to send the content preferences to the mobile device for storage in the store, e.g. by operator policy information sent from the home network by a suitable mechanism such as OMA_DM or SOAP-XML.

The mobile device may transmit a query (e.g. an ANQP extension) to the access point to request an indication of whether the further network can satisfy the content preferences as preliminary check. The query process may be a preliminary check that prevents the device having to do full authentication. If the preliminary check indicates that device is not allowed access to the network, no further check is required. If device 'claims' it is allowed access to the network e.g. because there is no adult content filtering requirement, this claim is confirmed by the first aspect of the invention, the second mechanism or the second embodiment.

The present invention also provides a method of operating a telecommunications network including:
  a mobile device;
  a home network with which the mobile device user has a
    subscription including content preferences, the home
    network including a content preference store for storing
    the content preferences, and home authenticating
    means for performing authentication of the mobile
    device; and
  a further network having at least one access point with
    which the mobile device can communicate, e.g., using
    appropriate standardised signalling and further authenticating means for controlling registration of the mobile
    device with the access point;
  the further network being connected to the home network
    for communication therebetween; and
  the method including:
  the further authentication means communicating with the
    home authentication means to perform an authentication process for the mobile device when the mobile
    device connects to the access point, which authentication process accesses data from the content preference
    store storing the user content preferences, determines if
    the further network can satisfy the content preferences,
    and controls registration of the mobile device with the
    access point in dependence upon whether the further
    network can satisfy the content preferences of the user.

According to this method, the mobile device may include a store which stores the user content preferences, and registration control means which generates a content query to the further network, and analyses a response to the content query so as to determine if the further network can satisfy the content preferences and to enable registration with the access point in dependence thereon. Preferably these steps are performed before the steps in the preceding paragraph. In this way the attach process to the access point can be aborted in appropriate circumstances before the home network signalling is performed.

The present invention also provides a method, according to the first embodiment, of operating a mobile device for use in a telecommunications network includes a home network with which the mobile device user has a subscription including content preferences, and a further network having at least one access point with which the mobile device can communicate, e.g., using appropriate standardised signalling; wherein the mobile device includes a store for storing the user content delivery preferences, and registration control means; wherein the registration control means generates a content query to the further network, and analyses a response to the content query to determine if the further network can satisfy the content preferences and to enable registration with the access point in dependence thereon.

It should be appreciated that, although the embodiments relate to controlling the delivery of (or filtering of) "adult" content (such as pornography), the invention is applicable to controlling the delivery of any type of content. For example, a user may have a preference to access networks where there is an engine to filter out non-English language websites from the content delivered, filter out content with abusive language or filter out specific websites. The content to be filtered or blocked may be specified by a user of the mobile device (or the person responsible for the subscription of the mobile device with the home network). The content to be filtered or blocked may also be specified by a third party, such as a government authority. For example, content that might be useful to terrorists may be filtered or blocked for particular subscriptions.

BRIEF DESCRIPTION OF THE DRAWINGS

For a better understanding of the present invention embodiments will now be described by way of example, with reference to the accompanying drawings, in which.

In the Figures like elements/steps are generally designated with the same reference numeral.

DETAILED DESCRIPTION OF EMBODIMENTS OF THE INVENTION

Key elements of a 3G mobile telecommunications network, and its operation, will now briefly be described with reference to FIG. 1.

Each base station (e.g. Node B 1 and Femto 2) corresponds to a respective cell of the cellular or mobile telecommunications network 12 and receives calls from and transmits calls to a mobile terminal 10 in that cell by wireless radio communication in one or both of the circuit switched or packet switched domains.

The mobile terminal 10 may be any portable telecommunications device, including a handheld mobile telephone, a smartphone, a tablet computer, a personal digital assistant (PDA) or a laptop computer equipped with a network access datacard. The mobile terminal 10 can be considered to comprise two main parts: a radio frequency part (radio unit) and a baseband part. The radio frequency part handles the transmission of radio frequency signals between the antenna of the mobile terminal 10 and the nodeB 1 or Femto 2, and for converting radio frequency signals into digital baseband signals (and vice versa). The baseband part is responsible for controlling and managing the transmission of the baseband signals to other components of the mobile terminal 10.

The nodeB 1 or Femto 2 can be considered to comprise two main parts: a radio frequency part (radio unit) and a baseband part. The radio frequency part handles the transmission of radio frequency signals between the antenna of the nodeB 1 or Femto 2 and the mobile terminal 10, and for converting radio frequency signals into digital baseband signals (and vice versa). The baseband part is responsible for controlling and managing the transmission of the baseband signals to other components of the mobile telecommunications network.

In a macro 3G network, the Radio Access Network (RAN) comprises Node Bs and Radio Network Controllers (RNCs). The Node B is the function within the 3G network that provides the physical and transport radio link between the mobile terminal (User Equipment, UE) and the network. The Node B performs the transmission and reception of data wirelessly across the radio interface, and also applies the codes that are necessary to describe channels in a CDMA system. The RNC is responsible for control of the Node Bs that are connected to it. The RNC performs Radio Resource Management (RRM), some of the mobility management functions and is the point where encryption is done before user data is sent to and from a mobile terminal. The RNC connects to the Circuit Switched Core Network through a Media Gateway (MGW) and to an SGSN (Serving GPRS Support Node) 5 in the Packet Switched Core Network. In FIG. 1, Node B 1 is controlled by RNC 3 across the Iub interface. An RNC may control more than one Node B.

Figure 1:
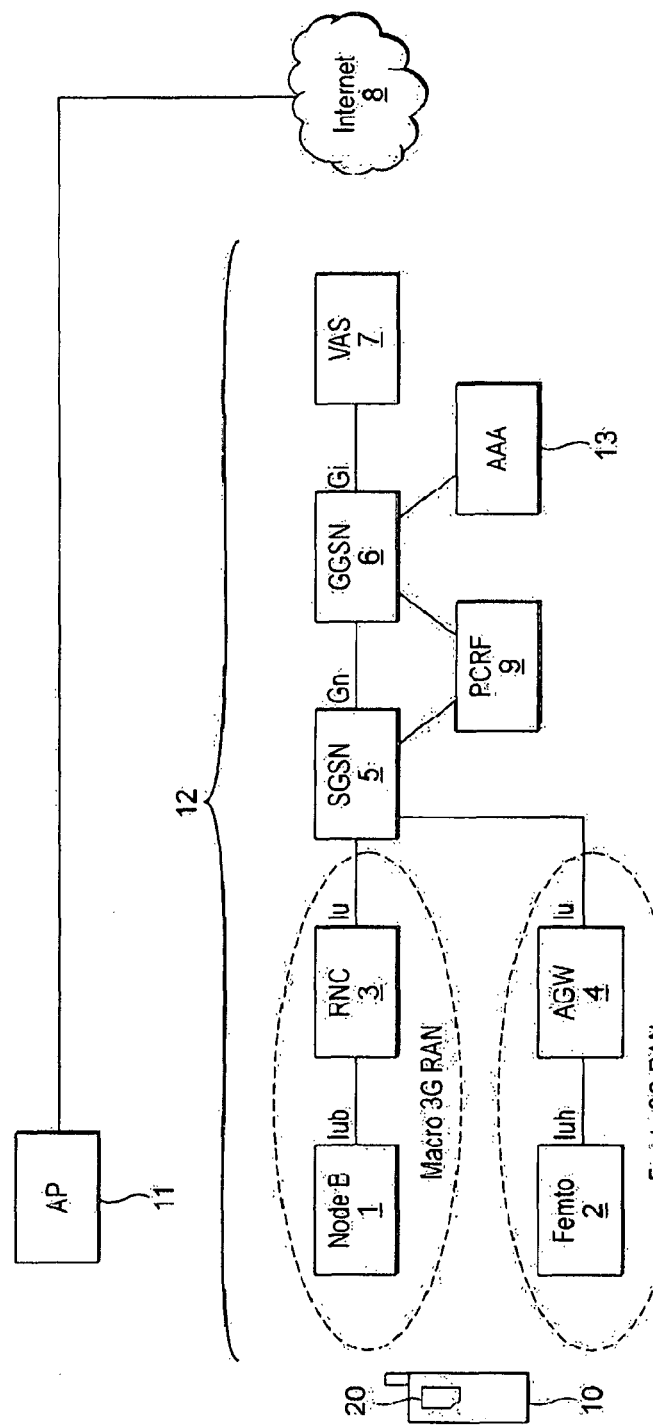
FIG. 1 shows elements of a telecommunications network including a 3G cellular network.

FIG. 1 also illustrates a Femto 3G RAN, with Femto 2 operating as the base station. Femto 2 is connected to an Access Gateway (AGW) (a.k.a Concentrator) 4 via an Iuh interface. Femto is an abbreviation of "femto-cell", and many other different names have been used to refer to the same apparatus.

The radio link between the Femto 2 and the mobile terminal uses the same cellular telecommunication transport protocols as Node B 1 but with a smaller range—for example 25 m. The Femto 2 appears to the mobile terminal 10 as a conventional base station, so no modification to the mobile terminal is required for it to operate with the Femto 2. The Femto 2 performs a role corresponding to that of Node B 1 in the macro 3G RAN.

The Femto 2 may be configured to serve a Wireless Local Area Network (WLAN) located in a home or office, in addition to GSM/UMTS/LTE networks. The WLAN could belong to the subscriber of the mobile terminal, or be an independently operated WLAN. The owner of Femto 2 can prescribe whether it is open or closed, whereby an open femto is able to carry communications from any mobile device in the GSM/UMTS/LTE network, and a closed femto is only able to carry communications from specific pre-assigned mobile devices.

Conventionally, in a 3G network (macro or Femto), the RANs are controlled by a mobile switching centre (MSC), not shown, and an SGSN (Serving GPRS Support Node) 5 of the core network. The MSC supports communications in the circuit switched domain, whilst the SGSN 5 supports communications in the packet switched domain—such as GPRS data transmissions. The SGSN 5 is responsible for the delivery of data packets from and to the mobile terminals within its geographical service area. It performs packet routing and transfer, mobility management (attach/detach and location management), logical link management, and authentication and charging functions. A location register of the SGSN 5 stores location information (e.g., current cell, current VLR) and user profiles (e.g., IMSI, address(es) used in the packet data network) of all mobile terminals registered with this SGSN.

Communications between the AGW 4 and the SGSN 5 are preferably IP based communications, and may be, for example, transmitted over a broadband IP network. Further, the connection between the Femto and the AGW 4 may use the PSTN (Public Switched Telephone Network). Typically a DSL cable connects the AGW 4 to the PSTN, and data is transmitted therebetween by IP transport/DSL transport. The Femto 2 or AGW 4 converts the cellular telecommunications transport protocols used between the mobile terminal 10 and the Femto 2 to the appropriate IP based signalling.

The femto 2 may be connected to the AGW 4 by means other than a DSL cable and the PSTN network. For example, the femto 2 may be connected to the AGW 4 by a dedicated cable connection that is independent of the PSTN, or by a satellite connection.

The SGSN 5 is in communication with the GGSN 6 (Gateway GPRS Support Node) across the Gn interface. The GGSN is responsible for the interworking between the GPRS network and external packet switched networks, e.g. the Internet. The GGSN enables the mobility of mobile terminals in the networks. It maintains routing necessary to tunnel the Protocol Data Units (PDUs) to the SGSN 5 that service a particular mobile terminal. The GGSN 6 converts the GPRS packets coming from the SGSN 5 into the appropriate packet data protocol (PDP) format (e.g., IP or X.25) and sends them out on the corresponding packet data network. In the other direction, PDP addresses of incoming data packets are converted to the mobile network address of the destination user. The readdressed packets are sent to the responsible SGSN 5. For this purpose, the GGSN 6 stores the current SGSN 5 address of the user and their profile in its location register. The GGSN 6 is responsible for IP address assignment and is the default router for the connected mobile terminal. The GGSN 6 also performs authentication and charging functions. The authentication is performed with reference to Authentication, Authorization and Accounting (AAA) server 13. Other functions include IP Pool management and address mapping, QoS and PDP context enforcement.

In turn the GGSN 6 may route data via any applicable Value Added Service (VAS) equipment 7, before data is forwarded towards its intended destination via the Internet 8. As an example of the functionality of the VAS equipment, the traffic may be inspected for adult content before reaching the end-user if this user is under 18 years of age or has opted for adult content filtering.

A policy server, e.g., PCRF (Policy and Charging Rules Function), apparatus 9 is also provided, in communication with both the SGSN 5 and the GGSN 6. The PCRF 9 provides billing and charging policy functions. The PCRF 9 may also store, or have access to, the preferences for adult content filtering for each subscriber. The adult content filtering preferences may be stored in a subscriber profile in an HSS (not shown in FIG. 1).

The SGSN 5, GGSN 6, VAS 7, PCRF apparatus 9 and AAA 13 comprise the core network of the mobile telecommunications network 12.

Additionally a WLAN access point (AP) 11 may be provided to enable the mobile terminal 10 (with WLAN communication capability) to access the Internet 8 independently of the mobile telecommunications network 12 (including the core thereof). The WLAN communications may be in accordance with a relevant Standard, such as IEEE 802.11. The access point 11 may be controlled by a service provider that is physically, technically and/or legally separate from the mobile telecommunications network.

Traffic in a mobile telecommunications network can be considered to be separated into "control plane" signalling and "user plane signalling". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted.

Figure 2:
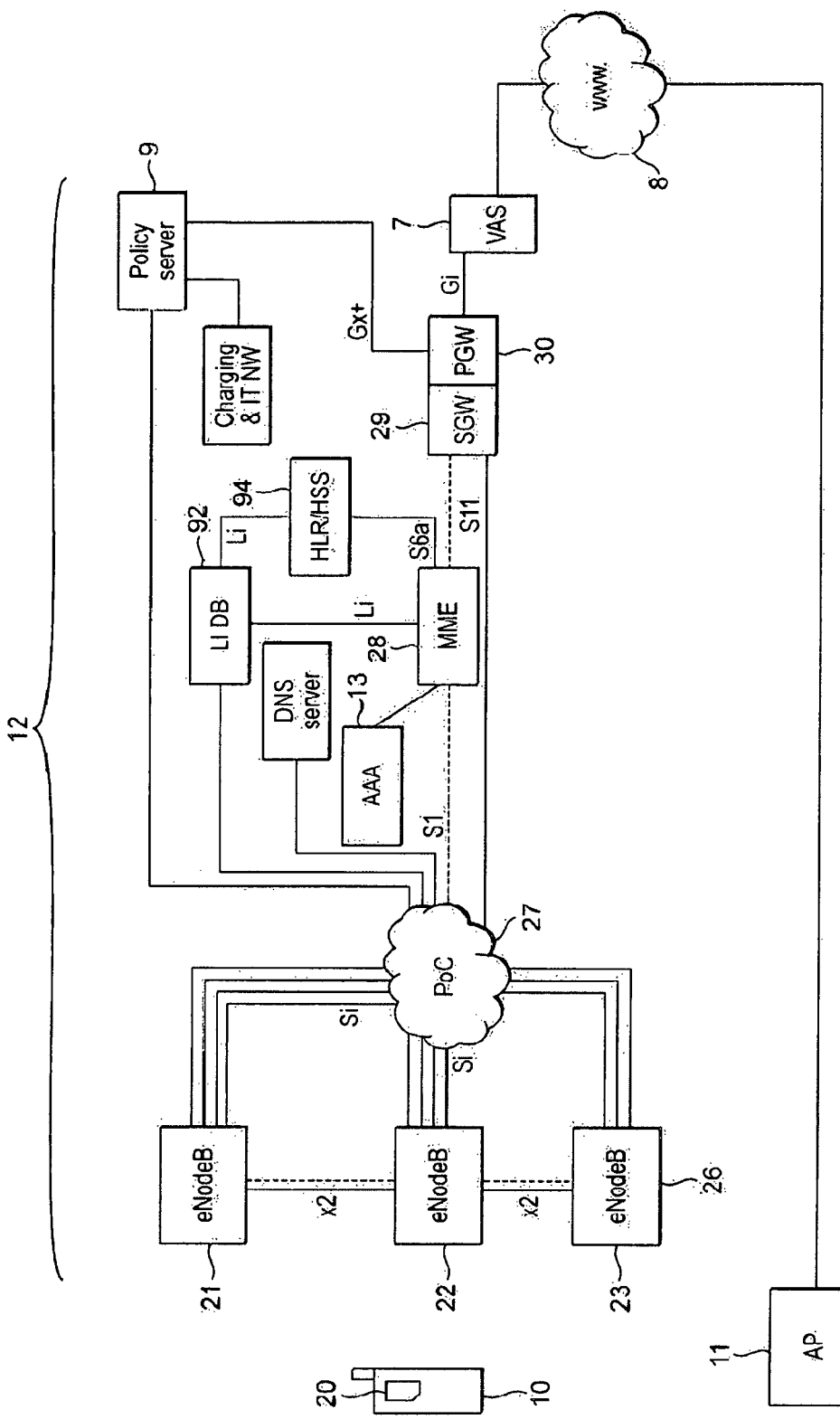
FIG. 2 shows the elements of a telecommunications network including a 4G cellular network.

FIG. 2 shows a high level description of the architecture of a LTE/SAE (4G) macro network.

The LTE/SAE network 12 includes eNode Bs 21,22,23 which make up the RAN. The eNode Bs effectively combine the functionality of the node B and the RNC of the 3G network. These eNodeBs are the network components which communicate with the mobile communication devices (e.g. 10). The eNodeBs are arranged in groups and each group controlled by a Mobility Management Entity (MME) 28 and a User Plane Entity (UPE), not shown.

The MME 28 performs many of the mobility functions traditionally provided by the 3G SGSN. The MME 28 terminates the control plane with the mobile device 10. It is responsible for terminating NAS (Non Access Stratum) Signalling such as MM (Mobility Management) and SM (Session Management) information as well as coordinating Idle Mode procedures. Other responsibilities of the MME include gateway selection inter MME 28 Mobility and authentication of the mobile device. The authentication is performed with reference to Authentication Authorization and Accounting (AAA) server 13.

The UPE manages protocols on the user plane such as, storing mobile terminal contexts, terminating the Idle Mode on the user plane, and PDP context encryption.

Each of the eNodeBs 21,22, 23 is connected to the mobile network core through a Point of Concentration (PoC) 27. All traffic from the eNodeBs 21, 22, 23 which is to be routed through the core mobile network is routed to the PoC 27. This includes both user plane and control plane data. On the control plane level, the PoC 27 routes data to and from the Mobility Management Entity (MME) 28 across the S1 interface. Control data is also sent to and from other core network components, including the Lawful Interceptor Database (LI DB) 92, DNS Server, Policy Server (including Charging rules and IT Network) 9 and Home Location Register/Home Subscriber Server (HLR/HSS) 94 (which contains subscriber and device profile and state information). The Policy Server 9 provides billing and charging policy functions. The Policy Server 9 may also store, or access from HLR/HSS 94, the preferences for adult content filtering for each subscriber.

User plane data, on the other hand, is transmitted by the PoC 27 to the Serving GateWay (SGW) 29 and then to the Packet data network GateWay (PGW) 30. The SGW and PGW are typically separate entities, with the SGW being a data plane element whose primary function is to manage user-plane mobility and data being transferred between the eNodeBs and the PDN Gateway (PGW). From the PGW, data is routed across a Value Added Service (VAS) node 7 to the Internet 8. In LTE/SAE this is the standard data path from the mobile terminals to the Internet. As an example of the functionality of the VAS equipment 7, the traffic may be inspected for adult content before reaching the end-user if this user is under 18 years of age or has opted for adult content filtering.

Additionally a WLAN access point (AP) 11 may be provided to enable the mobile terminal 10 (with WLAN communication capability) to access the internet 8 independently of the mobile telecommunications network 12 (including the core thereof). The WLAN communications may be in accordance with a relevant Standard, such as IEEE 802.11. The access point 11 may be controlled by a service provider that is physically, technically and/or legally separate from the mobile telecommunications network.

Each subscriber to the mobile telecommunications network 12 is provided with a smart card or SIM 20 which, when associated with the user's mobile terminal 10 identifies the subscriber to the network. The SIM card 20 is pre-programmed with a unique identification number, the "International Mobile Subscriber Identity" (IMSI) that is not visible on the card and is not generally known to the subscriber. The subscriber is issued with a publicly known number, that is, the subscriber's telephone number, by means of which callers initiate calls to the subscriber. This number is the MSISDN.

The UICC (Universal Integrated Circuit Chip, called SIM Card for telecommunications) is a tamper-proof component that can host MNO (Mobile Network Operator) applications. The best known application on the SIM 20 is the Network Access Application (NAA), through which the subscriber authenticates to the mobile network, and the device 10 is permitted to attach to the mobile network.

The NAA application residing in the SIM/UICC 20 which holds a subscriber identity and an authentication algorithm and provides the access to a network.

The network includes a home location register (HLR)—shown at 94 in FIG. 2, not shown in FIG. 1)—which, for each subscriber to the network, stores the IMSI and the corresponding MSISDN together with other subscriber data, such as the current or last known MSC or SGSN of the subscriber's mobile terminal.

Figure 3A:
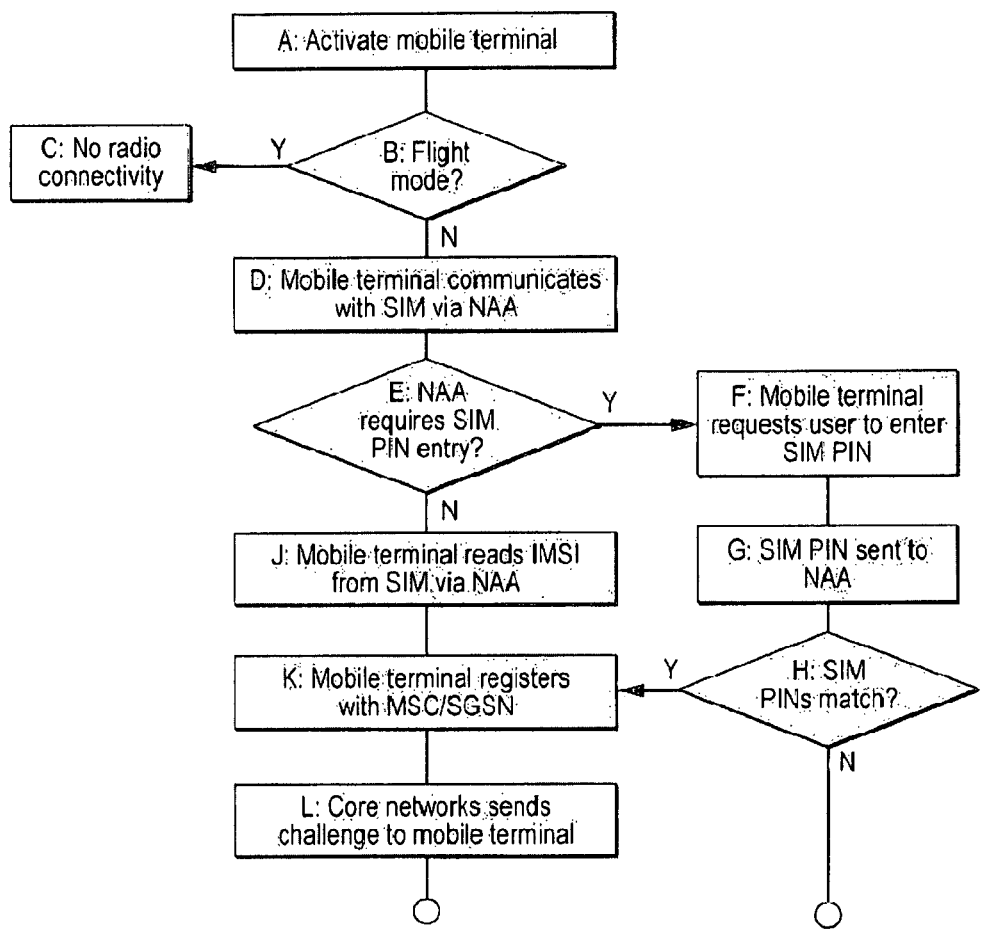
FIGS. 3A and 3B show the steps performed to authenticate a mobile device in a cellular telecommunications network.
Figure 3B:
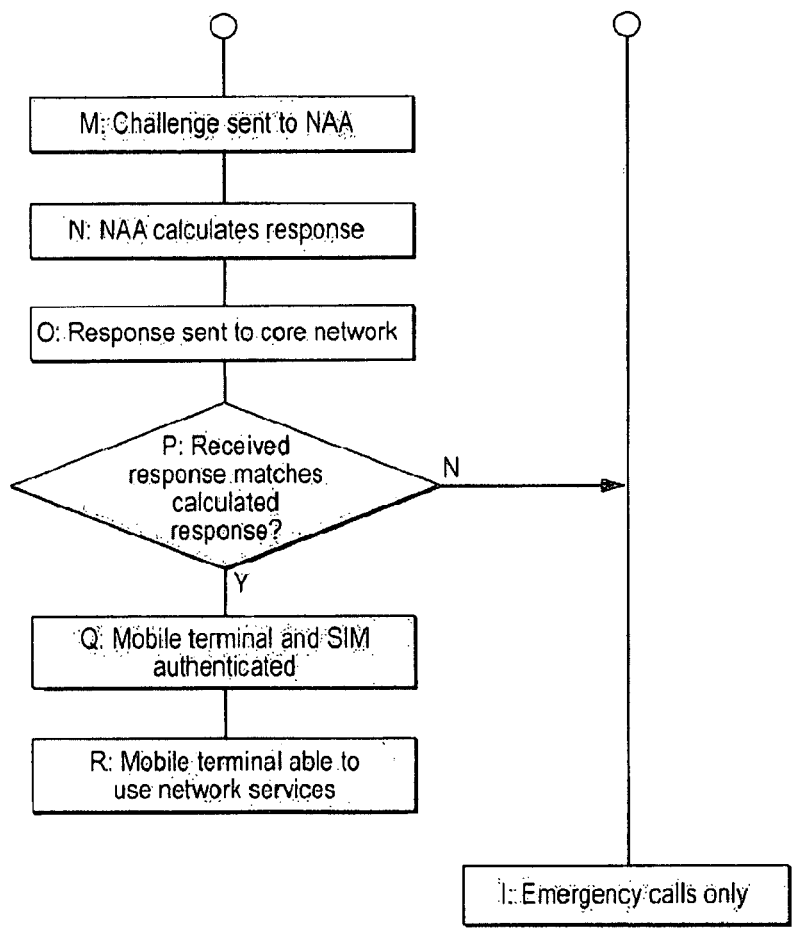

The authentication operation of the SIM in relation to a 3G network will now be briefly described with reference to FIGS. 3A and 3B but the principles also apply to a 4G network.

When mobile terminal 10 is activated (step A) it is determined whether the mobile terminal 10 is in "flight mode" (step B). Flight mode is a user-selectable mode in which the radio functions of the mobile terminal are disabled. Thus, in the flight mode the radio frequency part of the mobile terminal 10 is disabled. If it is determined that the mobile terminal 10 is in flight mode, then no further authentication steps are performed as the mobile terminal is unable to connect to the core network, and the process ends at step C.

On the other hand, if the flight mode is not enabled, the mobile terminal 10 then communicates with the NAA of its SIM 20 in order to attempt to authenticate with the network core (step D).

On receipt of the authentication request from the mobile terminal 10, the NAA identifies whether a SIM PIN is required to allow connectivity to the core network (step E). If a SIM PIN is required the NAA sends a request to the mobile terminal 10 to obtain the SIM PIN from the user. At step F the graphical user interface (GUI) of the mobile terminal 10 is used to prompt the user to enter the PIN, which the user does typically by using the physical keypad of the mobile terminal 10 or the touch screen of the mobile terminal 10. At step G the SIM PIN entered by the user is sent from the mobile terminal 10 to the NAA of the SIM 20. At step H it is determined whether the SIM PIN provided by the user matches the SIM PIN known to the NAA. If the SIM PINs do not match, the user may be given an opportunity to re-enter the SIM PIN for a predetermined number of times (typically three), and steps F, G and H are repeated to allow this. If after the predetermined number of attempts the SIM PINs do not match, then the mobile terminal 10 enters an emergency calls only state so that normal core network services are not available to the user but the ability to make emergency calls is retained (step I).

On the other hand, if at step H it is determined that the SIM PIN entered by the user matches the SIM PIN known to the NAA, then the process continues to step J. Step J is also performed directly after step E if the NAA does not require SIM PIN entry (and thus the process goes from step E directly to step J).

At step J the mobile terminal reads the IMSI from the SIM 20 via the NAA. The IMSI is transmitted to the Node B 1/Femto 2 associated with the particular cell in which the terminal 10 is located. In a traditional network, the NodeB 1/Femto 2 then transmits this IMSI to the MSC/SGSN 5 with which the NodeB 1/Femto 2 is registered. In a network using the functionality described in 3GPP TS 23.236, the Node B 1/Femto 2 follows prescribed rules to select which MSC/SGSN 5 to use, and then transmits this IMSI to the selected MSC/SGSN.

The MSC/SGSN 5 now accesses the appropriate storage location in the HLR present in the core network and extracts the corresponding subscriber MSISDN and other subscriber data from the appropriate storage location, and stores it temporarily in a storage location in a visitor location register (VLR) or in the SGSN itself. In this way, therefore the particular subscriber is effectively registered with a particular MSC/SGSN, and the subscriber's information is temporarily stored in the VLR associated with that MSC or in the SGSN itself (step K).

When the HLR is interrogated by the MSC/SGSN 5 in the manner described above, the AAA 13 additionally performs an authentication procedure for the mobile terminal 10. The AAA 13 transmits authentication data to the MSC/SGSN 5 in the form of a "challenge". Using this data, MSC/SGSN 5 passes the "challenge" to the mobile terminal 10 through base Node B 1/Femto 2 (step L). Upon receipt of this data, the mobile terminal 10 passes this data to the NAA of its SIM 20 (step M), which produces a "response" (step N). This response is generated using a cryptographic algorithm on the NAA of the SIM and a unique key Ki on the NAA of the SIM 20. The response is transmitted back to the MSC/SGSN 5 (step O) which checks it against its own information for the subscriber and the AAA 13 checks it against information that it has obtained for that subscriber from the HLR in order to complete the authentication process. If it is determined that the response from the mobile terminal 10 is as expected (step P), the mobile terminal 1 is deemed authenticated (step Q), and the mobile terminal 10 is then able to use network services (step R). At this point the MSC/SGSN 5 requests subscription data from the HLR. The HLR then passes the subscription data to the VLR/SGSN 5.

If at step P the received response does not match the response calculated by the AAA 13, then the mobile terminal 10 is not authenticated and the process goes to step I.

The authentication process may be repeated at regular intervals while the mobile terminal 10 remains activated and can also be repeated each time the mobile terminal makes or receives a call, if required. This authentication process confirms the identity of the user to the network, so the user can be charged for telecommunications services.

A cellular (mobile) network operator (PLMN) or a primary WLAN service provider selling a WLAN subscription to a subscriber, and providing service via an access point such as AP 11, which is controlled and/or owned separately from the cellular (mobile) network operator or the primary WLAN service provider, by a WLAN service provider, can provision the mobile device 10 with a roaming list of allowed roaming partners to which that subscriber can roam. This means that the mobile device 10 will use its SIM or USIM 20 credentials to authenticate with those WLAN service providers. The subscription will contain a profile indicating whether content filtering is activated or not for this subscription, which may be stored as subscriber profile in the HSS 94. HSS 94 may be accessed by a policy provisioning server e.g. PCRF 9.

The embodiments of the present invention provide an arrangement for implementing adult content filtering when the mobile network core of the home PLMN 12 with which the user of the mobile device 10 has a subscription, which includes the VAS 7 (which implements adult content filtering for traffic transmitted via the mobile network core), is bypassed.

According to a first embodiment of the invention a user's mobile device 10 is made aware of user's subscription profile for adult content filtering by communicating with the access point 11.

The IEEE 802.11u Access Network Query Protocol (ANQP) has been specified by the IEEE for WLAN access. According to this protocol, the mobile device 10 may query the WLAN access point 11 for information about the access point 11 before making a decision on whether to authenticate with the WLAN network or not. With current IEEE specifications and extensions introduced by the Wi-Fi Alliance in the Passpoint™ Certification programme (based on Wi-Fi Alliance Hotspot 2.0 specifications, briefly discussed below), a mobile device 10 can query the access point 11 for a diverse range of information including venue name, roaming partner list, 3GPP network information and WAN metrics among others.

According to the first embodiment of the invention, the ANQP protocol is extended to include a query command from the mobile device 10 to the access point 11 to obtain an indication of whether adult content filtering is supported by the access point 11.

Figure 4:
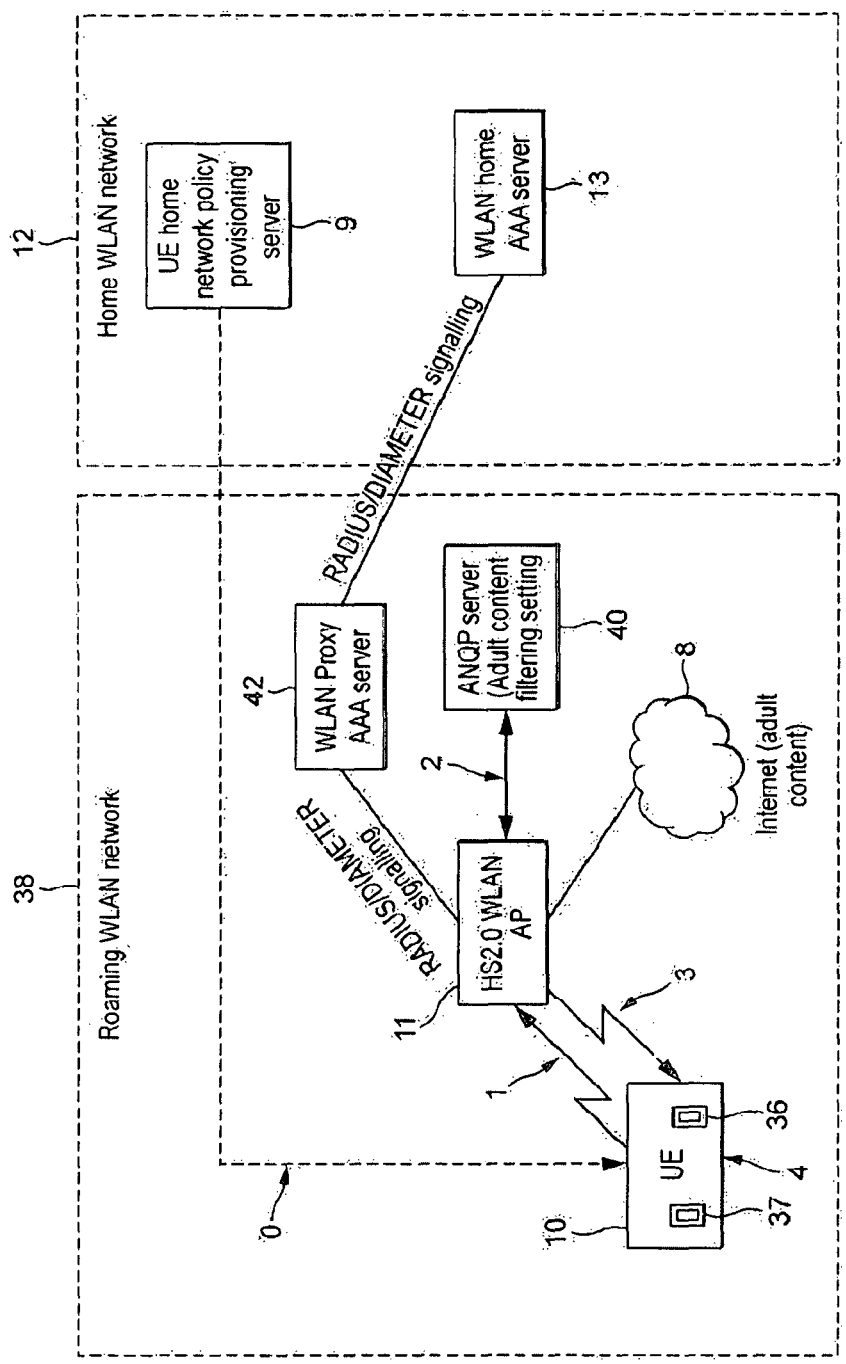
FIG. 4 shows the elements of a home network and a further, roaming network and the exchange of data therebetween according to a first embodiment of the invention.

The embodiment will be described with reference to FIG. 4. A WLAN access point 11, provided by a WLAN service provider 38, facilitates access by the mobile device 10 to the Internet 8. The WLAN service provider 38 includes an ANQP server 40. The access point 11 forwards received ANQP queries from the mobile device 10 to the ANQP server 40. When the ANQP server 40 responds to the query, the access point 11 forwards the response to the mobile terminal 10 that is the source of the query. The ANQP server may also be located within the access point 11.

To enable the mobile device 10 to use its SIM or USIM 20 credentials to authenticate with WLAN service provider 38, the WLAN service provider 38 includes an AAA server 42 that acts as a proxy AAA server to the 3GPP network AAA server 42 of PLMN 12. The proxy AAA server 42 communicates with the home PLMN 12 with which the user of the mobile device 10 has a subscription. The PCRF/Policy server 9 and the AAA server 13 of the PLMN 12 are shown in FIG. 4 but it should be appreciated that the PLMN 12 may also include other elements, such as the elements of a 3G network shown in FIG. 1 and/or the elements of a 4G network shown in FIG. 2.

Briefly, according to the first embodiment of the invention, the mobile device 10 of a subscriber has a subscription with adult content filtering activated or indication of preference to access networks without adult content filtering. The mobile terminal 10 makes an ANQP query to the access point 11 of a visited service provider 38 to request information on whether adult content filtering is supported in the visited network 38, which is forwarded to the ANQP server 40, and the ANQP server 40, will respond with appropriate information on the support of adult content filtering and level of adult content filtering supported. The ANQP query may be an extension to the ANQP queries defined in the Wi-Fi Alliance Hotspot (HS) 2.0 Specification.

The communications between the elements shown in FIG. 4 will now be described. The communications between the elements in FIG. 4 are shown by encircled numbers, and these are described immediately below:

0. As an initial step the mobile device 10 is made aware of the adult content filtering element of the subscription via the operator policy information sent to the mobile device 10 for that specific user by any suitable mechanism. The mobile device 10 may be made aware of user's subscription profile for adult content filtering, e.g. as part of subscription Management Object or user specific operator policy Management Object downloaded to the mobile device 10 via a suitable mechanism such as OMA-DM or SOAP-XML. This will typically be done when the mobile device 10 is connected to the macro network of the PLMN 12 via NodeB1 or eNodeB 21, 22 or 23, prior to the mobile device 12 connection to the PLMN 12 via the access point 11. The content filtering policy information for the user may be provided by the policy server/PCRF 9 of the PLMN 12. Alternatively, the content filtering preferences of the user may be pre-stored on the mobile device 10 or the SIM 20 at the time of manufacture or distribution to the user. However they are delivered, the content filtering preferences may be stored on a store 36 on the mobile device 10.

1. The mobile device 10 includes registration control means 37 that uses an ANQP extension to make a query to the access point 11 on support of adult content filtering supported by the WLAN network 38 providing the service. If the access point 11 is connected to different realms (WANs), the query can be on a per realm basis. The ANQP extension is described in more detail below.

2. The WLAN access point 11 then signals to the ANQP server 40 to request relevant information on content filtering from the ANQP server 40. The ANQP server 40 responds to indicate whether support for adult content filtering is provided by the access point 11 of the service provider network 38 through which the subscriber's traffic will be routed. However, it should be appreciated that the ANQP server 40 functionality may be incorporated into the access point 11 itself, in which case no external signalling is necessary.

3. The access point 11 transmits the ANQP server 40 response to the mobile device 10 to indicate whether support of adult content filtering is provided in service provider network 38 through which the subscriber's traffic will be routed via access point 11.
4. The mobile device 10 uses the information received on adult content filtering to decide whether to associate with the access point 11 or not. If the mobile device 10 wishes to associate with the access point 11, the mobile device 10 initiates an authentication attempt to WLAN access point 11 using 802.1x procedures. The access point 11 forwards the authentication request to proxy AAA server 42 using RADIUS/DIAMETER signalling. The proxy AAA server 42 forwards authentication request to Home AAA server 13 using RADIUS/DIAMETER signalling. The Home AAA server 13 queries subscription database in, e.g. the HLR/HSS 94, to validate the request. The Home AAA server 13 uses information from Proxy AAA server 42, together with subscription information indicating whether mobile device 10 is allowed access, to pass/fail the authentication request. The Home AAA server 13 sends an authentication response to proxy AAA server 42 which forwards it to the WLAN access point 11 in the roaming network. If authentication is passed, then the mobile device 10 may attach to the access point 11. The authentication may be performed similarly to the challenge-and-response procedure described above as steps L to R of FIGS. 3A and 3B—the challenge-and-response being communicated to from/to the home AAA server 13 via the service provider network 38.

The Wi-Fi Alliance HS2.0 Specification in relation to Hotspot 2.0 ANQP Elements will now be briefly described, but will be known to those skilled in the art.

Within the Hotspot 2.0 ANQP Elements definitions all reserved fields are set to zero on transmission and ignored upon reception. In addition little endian encoding is used for multi-byte fields and subfields.

Figure 5:
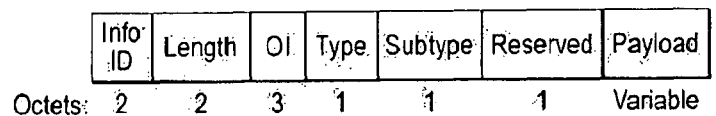
FIG. 5 shows the format of an element used to make a ANQP query according to a first embodiment of the invention, in accordance with the Wi-Fi Alliance Hotspot 2.0 Specification.
Figure 8:
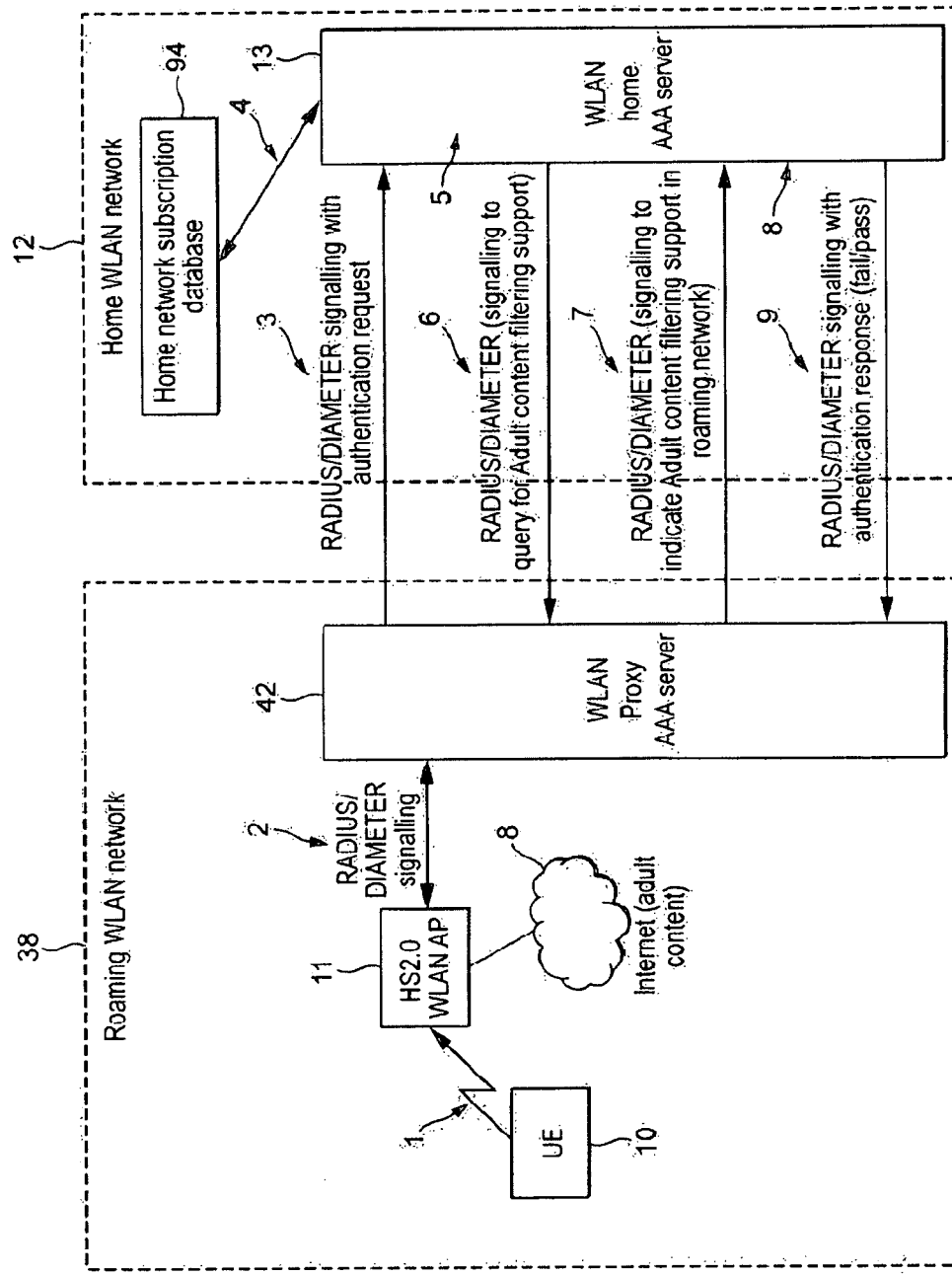
FIG. 8 shows the elements of a home network and a further, roaming network, and data exchanges therebetween, according to a first option of a second embodiment of the invention.

The Hotspot (HS) 2.0 ANQP elements provide additional functionality to IEEE 802.11u ANQP elements supporting HS 2.0 features. These elements are formatted as defined by the ANQP vendor-specific list element (see 8.4.4.8 in IEEE 802.11-2012, Part 11: Wireless LAN Medium Access Control (MAC) and Physical Layer (PHY) Specifications [1]), shown in FIG. 5. The Type, Subtype, Reserved and Payload fields comprise the Vendor Specific Content as shown in FIG. 8-414 of [1].

The Info ID field is a 2-octet field whose value is the value for the ANQP vendor-specific list (value 56797, see Table 8-184 in [1]).

The Length field is a 2-octet field whose value is set to 6 plus the length of the Payload field.

The OI is a 3-octet field and is defined in section 8.4.2.71.5 in [1]. The 01 field is set to the value used by the WFA (Wi-Fi Alliance), value 0x 50 6F 9A (Wi-Fi Alliance Technology Indicator Assignments, V1.0.1, October 2012 [2]).

The Type field is a 1-octet field allocated from the WFA TIA (Telecommunications Industry Association) number space to indicate a HS 2.0 ANQP element type (value 0x11) in [2].

The Subtype field is a 1-octet field whose value identifies the HS 2.0 ANQP element. Values for the Subtype field are defined in Table 1 below.

The Reserved field is a 1-octet field to ensure that the header of the ANQP element is word aligned.

The Payload field is a variable length field containing information specific to the HS 2.0 ANQP element e.g. as defined in Sections 4.1 to 4.7 of the Wi-Fi Alliance HS2.0 Specification Release 1.

Table 1 shows the Subtype field, which is a 1-octet field whose value identifies the HS 2.0 ANQP element. The known element names and subtype values "0"-"7" are shown. In addition, according to this embodiment of the invention a Content Filtering Indication element with subtype value "x" is added.

TABLE 1

Hotspot 2.0 ANQP Element Subtype Definition

| Element Name | Subtype Value | Description (section) of Wi-Fi Alliance HS2.0 Release 1 Specification |
|---|---|---|
| Reserved | 0 | n/a |
| HS Query list | 1 | 4.1 |
| HS Capability list | 2 | 4.2 |
| Operator Friendly Name | 3 | 4.3 |
| WAN Metrics | 4 | 4.4 |
| Connection Capability | 5 | 4.5 |
| NAI Home Realm Query | 6 | 4.6 |
| Operating Class Indication | 7 | 4.7 |
| Content Filtering Indication | x | "4.x" |
| Reserved | x + 1-255 | n/a |

According to the present embodiment, the Wi-Fi Alliance HS2.0 Specification is amended to include the following additional section:

4.x Content Filtering Indication Element

Figure 6:
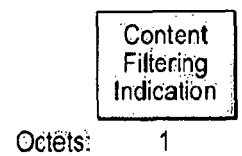
FIG. 6 shows the format of the content filtering information sent in the ANQP query.

The Content Filtering Indication element is shown in FIG. 6 and provides information about the support for Adult content filtering by the access point 11's service provider network 38 in place for home subscribers and roaming subscribers. The Element reports the support of content filtering by the service provider network 38 of the access point 11. In this version of the specifications, only adult content filtering indication is specified.

Figure 7:
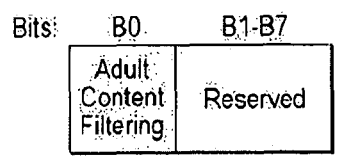
FIG. 7 shows the content filtering information field format of the ANQP query.

The format of the Content Filtering Indication is shown in FIG. 7.

The Content Filtering Indication is a bit map indicating what type(s) of content filtering are supported by the access point 11's service provider network 38.

A setting of '1' of the bitmap indicates that the type of content filtering is supported. A setting of '0' indicates no support of the respective type of content filtering.

Use Example 1

Kate has just started high school and her mum has bought her a brand new mobile phone. However, Kate's mum is concerned about her exposure to adult content material and requested the service provider to maintain adult content filtering for the subscription with the PLMN.

Kate goes out with her friends to a café. The mobile device manager detects a number of valid Wi-Fi service providers some of which are in the mobile device's roaming list. Since the subscription with the PLMN only allows connection to a service provider supporting adult content filtering, the mobile device queries the Wi-Fi access point on its support for content filtering. The response indicates that this WLAN service provider does not support adult content filtering. At this point the mobile device manager aborts further association to the WLAN service provider and queries the next Wi-Fi access point in the roaming list. This time the response from the access point is that it supports adult content filtering. The mobile device performs automatic authentication to associate with this WLAN access point. At some point Kate wants to browse the Internet with her friends. Kate is delighted that she is already connected to a Wi-Fi access point and can straight away start browsing. Kate's mum is equally happy in the knowledge that Kate will only access a WLAN network that supports adult content filtering.

Use Example 2

Mr. Brown is an avid Internet browser who likes the freedom of having Internet access wherever he is. However, Mr. Brown is constantly irritated by restrictions from hotspot networks supporting adult content filtering to access of certain content on the Internet which is not always of an adult nature but gets wrongly filtered by the network's adult content filtering engine. Mr. Brown requests his home service provider to preferentially connect him to visited networks with no adult content filtering support unless no other connectivity option is available.

Mr. Brown usually picks up his son from school and likes to browse the Internet while waiting. The mobile device connection manager queries surrounding networks for their support of adult content filtering and detects both a network which indicates support for adult content filtering and a network without adult content filtering support (both of them being roaming partners to the home network). The connection manager automatically connects to the network without adult content filtering as per the preference of Mr. Brown.

A second embodiment of the invention provides mechanisms based on a handshake between a Proxy AAA server and a Home AAA server for preventing a mobile device 10 with a subscription for which adult content filtering is active to access a network without adult content filtering support. According to these mechanisms, the home AAA server or proxy AAA server is responsible for preventing a mobile device 10 with a subscription with adult content filtering active to access a network without adult content filtering support.

Figure 9:
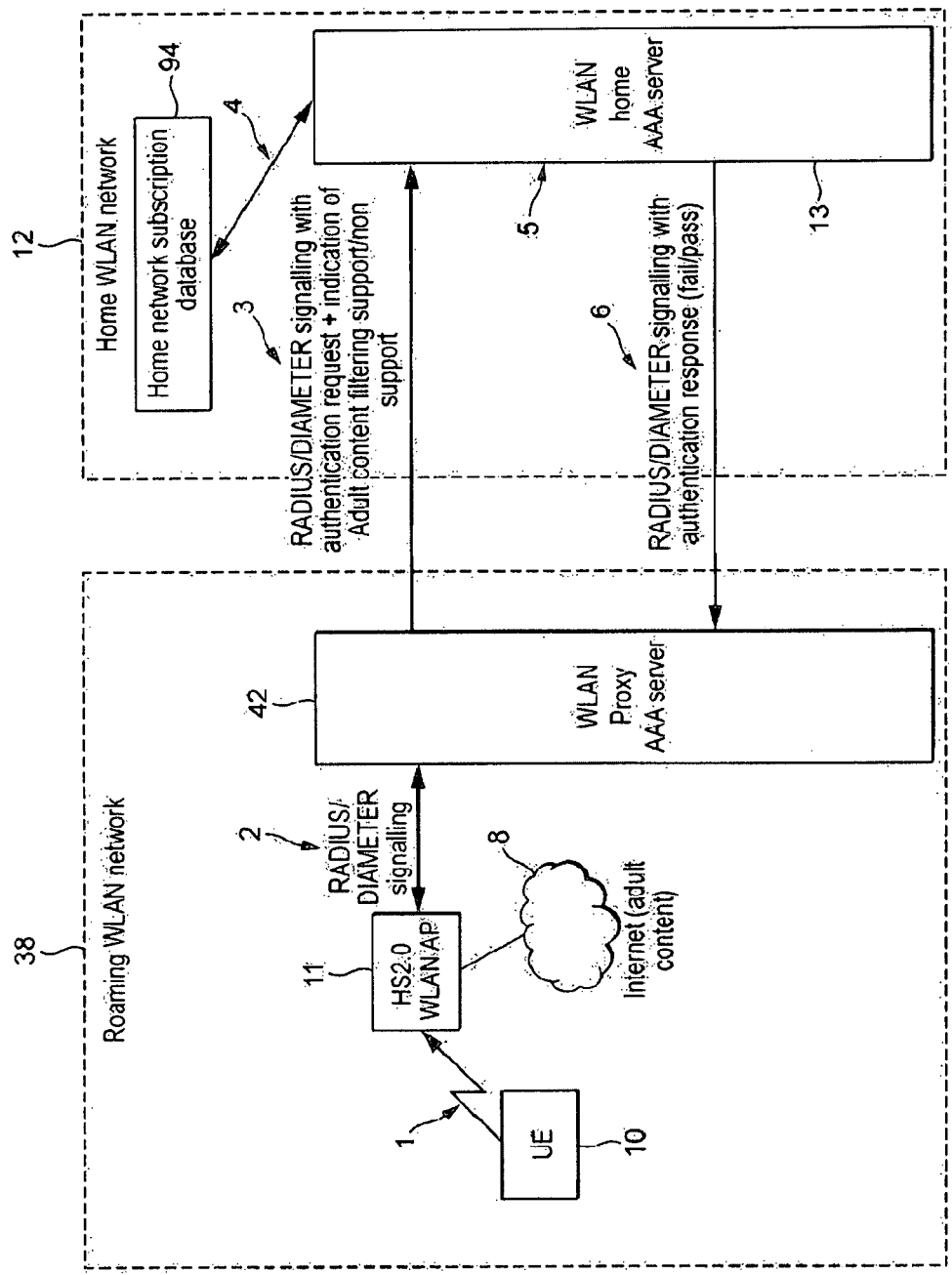
FIG. 9 shows the elements of a home network and a further, roaming network, and the data exchanges therebetween, according to a second option of the second embodiment of the invention.
Figure 10:
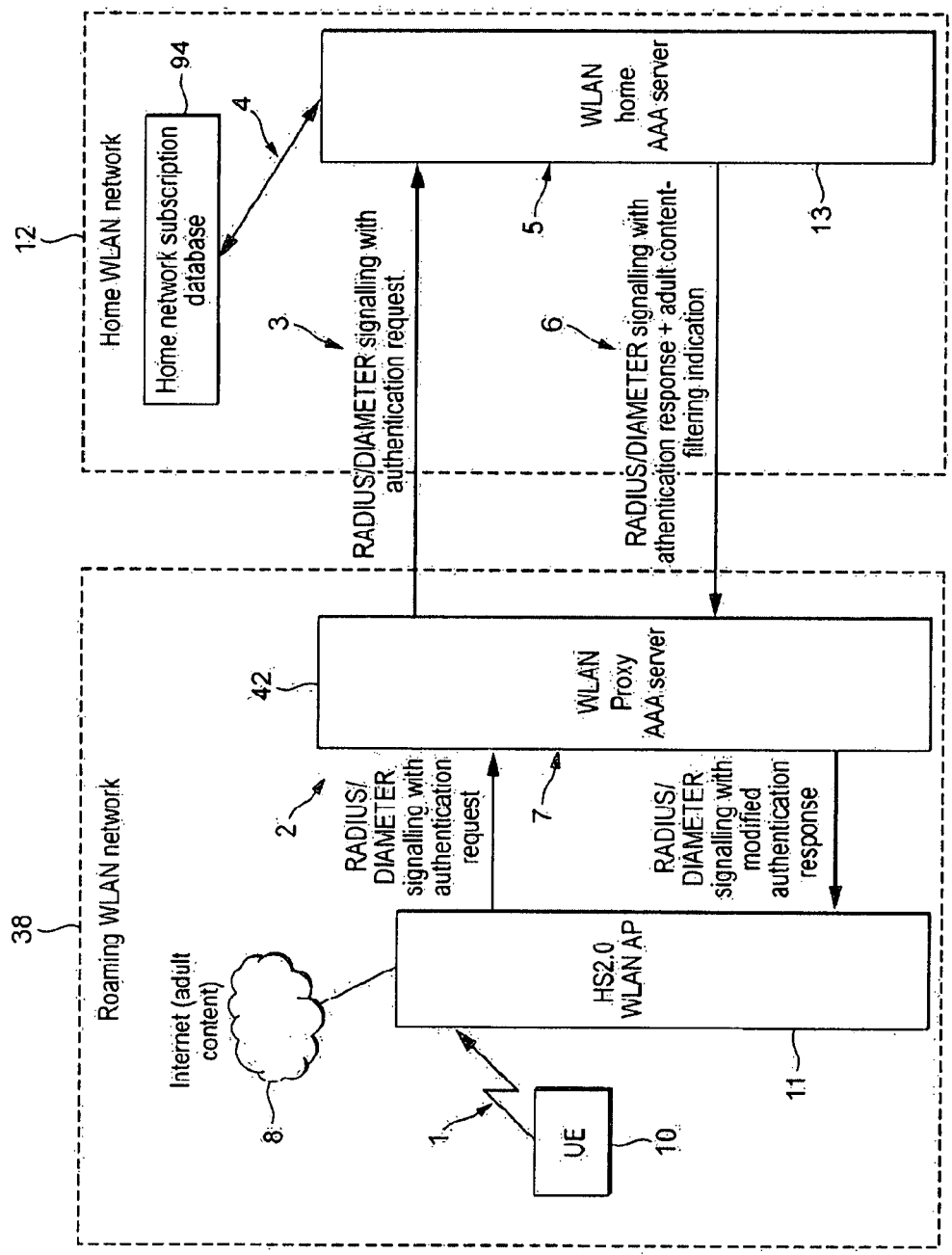
FIG. 10 shows the elements of a home network and a further, roaming network, and the data exchanges therebetween, according to a third option of the second embodiment of the invention.

The embodiment will be described with reference to FIGS. 8, 9 and 10. A WLAN access point 11, provided by a WLAN service provider 38, facilitates access by the mobile device 10 to the Internet 8. To enable the mobile device 10 to use its SIM or USIM 20 credentials to authenticate with WLAN service provider 38, the WLAN service provider 38 supports an AAA server 42 (acting as a proxy) which can communicate with the AAA server 13 of the home PLMN 12 with which the user of the mobile device 10 has a subscription. The PCRF/Policy server 9 and the AAA server 13 of the PLMN 12 are shown in FIGS. 8, 9 and 10 but it should be appreciated that the PLMN 12 may also include other elements, such as the elements of a 3G network shown in FIG. 1 and/or the elements of a 4G network shown in FIG. 2.

The following options for providing this functionality will now be described, by way of example.

Option 1: Home AAA Server 13 Queries Proxy AAA Server 42 for Adult Content Filtering Support Before Passing/Failing Authentication Request (FIG. 8).

The communications between the elements shown in FIG. 8 will now be described. The communications between the elements in FIG. 8 are shown by encircled numbers, and these are described immediately below. The communications provide a mechanism to prevent access on a roaming WLAN network 38 with a home AAA server 13 query of adult content filtering by roaming network 38.

1. The mobile device 10 initiates authentication attempt to the WLAN AP 11 using 802.1x procedures.
2. The access point 11 forwards authentication request to proxy AAA server 42 using RADIUS/DIAMETER signalling.
3. The Proxy AAA 42 server forwards authentication request to the Home AAA server 13 using RADIUS/DIAMETER signalling. At this point the challenge-and-response procedure described similarly to steps L to P of FIGS. 3A and 3B may be performed. However, confirmation of authentication is not yet communicated to the mobile device 10.
4. The Home AAA 13 server queries the HLR/HSS database 94 to validate the authentication request.
5. The Home AAA 13 server identifies that Adult content filtering is active for the subscription.
6. The Home AAA 13 server sends RADIUS/DIAMETER signalling to the proxy AAA server 42 to query for support of adult content filtering support in roaming network 38.
7. The Proxy AAA 42 sends a response indicating support/non-support of Adult content filtering in the roaming network 38.
8. The Home AAA 13 server uses information from Proxy AAA server 42, together with subscription information indicating whether the mobile device 10 is allowed access, to pass/fail authentication request. That is, even if the challenge-and-response authentication is successful, an authentication failed indication will be generated if the content filtering capabilities of the visited service provider 39 do not correspond to the subscription profile in HLR/HSS 94.
9. The Home AAA server 42 sends authentication response to proxy AAA server 40 which forwards it to the WLAN access point 11 in the roaming network, which is then passed to the mobile device 10.

RADIUS protocol signalling aspects are described in the Internet Engineering Task Force (IETF) Network Working Group RFC 2865. This option adds new RADIUS request/response message exchange between proxy AAA 42 and home AAA server 13 to allow Home AAA server 13 to take into consideration content filtering support in a roaming network in its decision to pass/fail the authentication request.

Option 2: Proxy AAA Server 42 Forwards Authentication Request to Home AAA Server 13 Together with an Indication of its Support for Adult Content Filtering (FIG. 9)

The communications between the elements shown in FIG. 9 will now be described. The communications between the elements in FIG. 9 are shown by encircled numbers, and these are described immediately below. The communications provide default forwarding by proxy AAA server 42 of Adult content filtering support on roaming Wi-Fi network 38.

1. The mobile device 10 initiates authentication attempt to the WLAN AP 11 using 802.1x procedures.

2. The access point 11 forwards an authentication request to proxy AAA server 42 using RADIUS/DIAMETER signalling.

3. The Proxy AAA server 42 forwards authentication request to Home AAA server 13 together with an indication of adult content filtering support in roaming WLAN network. The authentication request may be sent using RADIUS/DIAMETER signalling. At this point the challenge-and-response procedure similar to that described above in steps L to P of FIGS. 3A and 3B may be performed. However, confirmation of authentication is not yet communicated to the mobile device 10.

4. The Home AAA server 13 queries the HLR/HSS subscription database 94 to validate the authentication request.

5. The Home AAA server 13 identifies that Adult content filtering is active for subscription and uses information on adult content filtering support from proxy AAA server 42 to pass/fail authentication request That is, even if the challenge-and-response authentication is successful, an authentication failed indication will be generated if the content filtering capabilities of the visited service provider 38 do not correspond to the user preference in the HLR/HSS subscription database 94.

6. The Home AAA server 13 sends RADIUS/DIAMETER signalling with authentication response to proxy AAA server 42 which forwards the response to the WLAN access point 11 in the roaming network and subsequently to the mobile device 10.

RADIUS protocol signalling aspects are described in the Internet Engineering Task Force (IETF) Network Working Group RFC 2865.

According to the Standard, Access-Request packets convey information used to determine whether a user is allowed access to a, specific Network. Access Server (NAS), and any special services requested for that user.

A summary of the Access-Request packet format is shown below, The fields are transmitted from left to right.

| 0 | 1 | 2 | 3 |
|---|---|---|---|
| 0 1 2 3 4 5 6 7 | 8 9 0 1 2 3 4 5 | 6 7 8 9 0 1 2 3 4 5 6 7 8 9 0 1 | |
| Code | Identifier | Length | |
| Request Authenticator ||||
| Attributes... ||||

The Attribute field is variable in length, and contains the list of Attributes that are required for the type of service, as well as any desired optional Attributes. According to the embodiment, the RADIUS Access Request message is modified to include an attribute on Adult content filtering support.

Option 3: Proxy AAA Server 42 Modifies Authentication Response from Home AAA Server 13 Using Indication from Home AAA Server 13 on Subscription being Subject to Adult Content Filtering and its Knowledge of Support/Non-Support of Adult Content Filtering (FIG. 10).

The communications between the elements shown in FIG. 10 will now be described. The communications between the elements in FIG. 10 are shown by encircled numbers, and these are described immediately below.

1. The mobile device 10 initiates authentication attempt to the WLAN AP 11 using 802.1x procedures.

2. The access point 11 forwards an authentication request to proxy AAA server 42 using RADIUS/DIAMETER signalling.

3. The Proxy AAA 42 server forwards authentication request to Home AAA server 13 using RADIUS/DIAMETER signalling. At this point the challenge-and-response procedure similar to that described above in steps L to P of FIGS. 3A and 3B may be performed.

4. The Home AAA server 13 queries the HLR/HSS subscription database 94 to validate request.

5. The Home AAA server 13 identifies that Adult content filtering is active for subscription. The Home AAA server 13 passes/fails authentication attempt by validating credential information (determining if the challenge-and-response match) without considering support or non-support of adult content filtering by the roaming network.

6. The Home AAA 42 sends an authentication response and additionally indicates that access is subject of adult content filtering support by roaming network.

7. The Proxy AAA server 42 uses information that the mobile device 10 is subject to adult content filtering and its knowledge of adult content filtering support by the roaming network 38 to modify the authentication response accordingly, e.g. change response to fail if no adult content filtering support by roaming network 38. That is, even if the challenge-and-response authentication is successful, an authentication failed indication will be generated if the content filtering capabilities of the visited service provider 38 do not correspond to the Subscription profile in HLR/HSS database 94 The Proxy AAA server 42 forwards the response to the WLAN access point 11 in the roaming network, which is forwarded to the mobile device 10.

RADIUS protocol signalling aspects are described in the Internet Engineering Task Force (IETF) Network Working Group RFC 2865.

According to the Standard, Access-Request packets convey information used to determine whether a user is allowed access to a specific Network Access Server (NAS), and any special services requested for that user.

A summary of the Access-Request packet format is shown below, The fields are transmitted from left to right.

| 0 | 1 | 2 | 3 |
|---|---|---|---|
| 0 1 2 3 4 5 6 7 | 8 9 0 1 2 3 4 5 | 6 7 8 9 0 1 2 3 4 5 6 7 8 9 0 1 | |
| Code | Identifier | Length | |
| Request Authenticator ||||
| Attributes... ||||

The Attribute field is variable in length, and contains the list of Attributes that are required for the type of service, as well as any desired optional Attributes. According to the embodiment, the RADIUS Access-Accept packet is modified to include an attribute on Adult Content Filtering.

Figure 11:
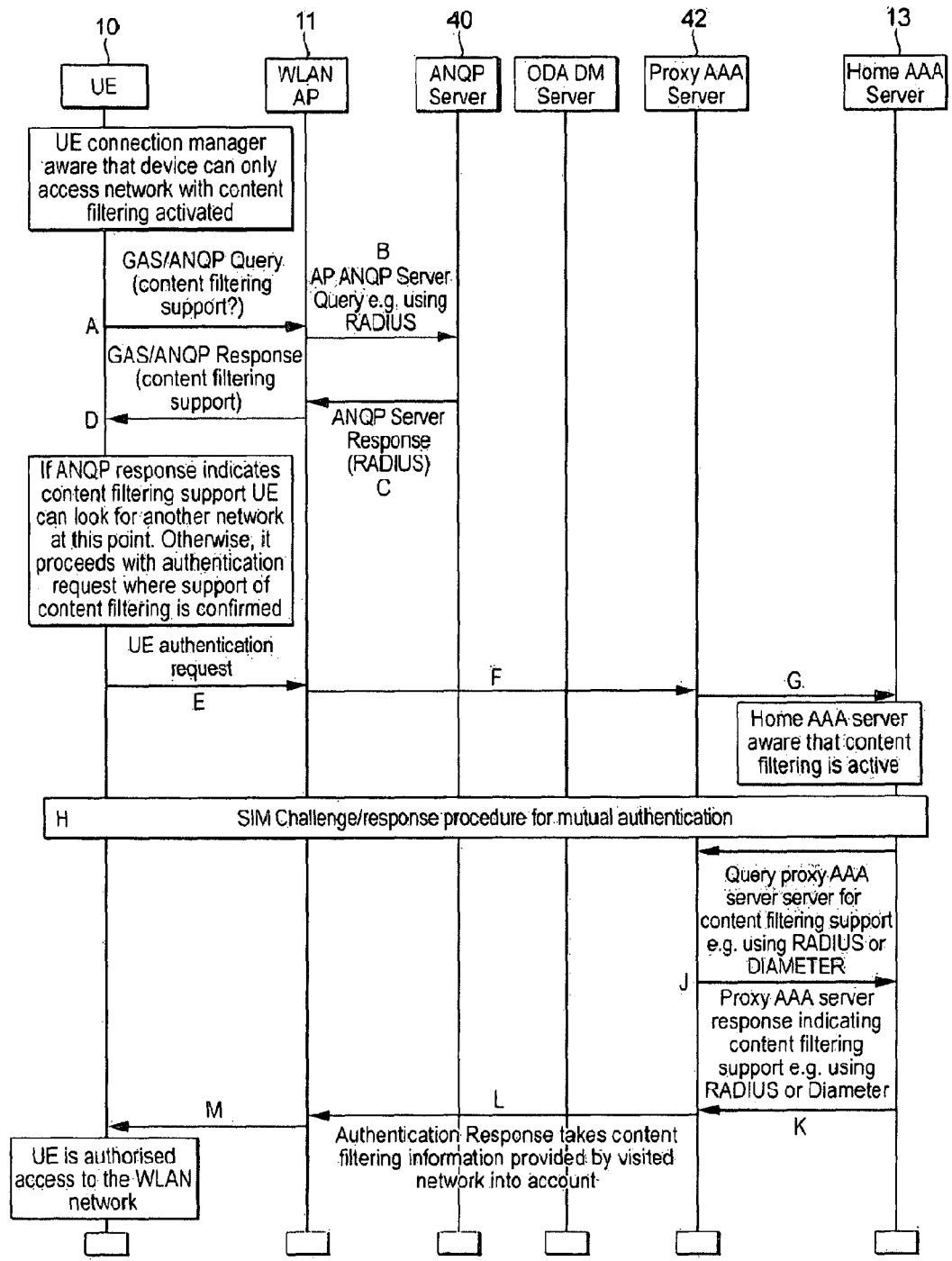
FIG. 11 shows the elements of a home network and a further, roaming network, and the data exchanges therebetween, in an arrangement that combines the first and second embodiments of the invention.

FIG. 11 shows an example of the signalling that performed when the first and second embodiments are combined. FIG. 11 summarises the steps for a Mobile device 10 to logon to the access point 11 taking into consideration support Of content filtering. The signalling describes the option where the home AAA server 13 queries the proxy AAA server 42 for support of content filtering by the visited network (option 1, FIG. 8). The first embodiment could also be combined with option 2 or 3 of the second embodiment.

The communications between the elements shown in FIG. 11 will now be described. The communications between the elements in FIG. 11 are shown by capital letters "A" to "L", and these are described below:

As an initial step the mobile device 10 is made aware of the adult content filtering element of the user's subscription via the operator policy information sent to the mobile device 10 for that specific user by any suitable mechanism. The mobile device 10 may be made aware of user's subscription profile for adult content filtering, e.g. as part of subscription Management Object or user specific operator policy Management Object downloaded to the mobile device 10 via a suitable mechanism such as OMA-DM or SOAP-XML. This will typically be done when the mobile device 10 is connected to the macro network of the PLMN 12 via NodeB1 or eNodeB 21, 22 or 23, prior to the mobile device 10 connection to the PLMN via the access point 11. The content filtering policy information for the user may be provided by the policy server/PCRF 9 of the PLMN 12. Alternatively, the content filtering preferences of the user may be pre-stored on the mobile device 10 or the SIM 20 at the time of manufacture or distribution to the user. This corresponds to step 0 of FIG. 4.

A. The mobile device 10 uses an ANQP extension to make a query to the access point 11 on support of adult content filtering supported by the WLAN network 38 providing the service. If the access point 11 is connected to different realms (WANs), the query can be on a per realm basis. The ANQP extension is described above. This corresponds to step 1 of FIG. 4.

B. The WLAN access point 11 then signals to the ANQP server 40 to request relevant information on content filtering from the ANQP server 40. This corresponds to step 2 (first part) of FIG. 4.

C. The ANQP server 40 responds to indicate whether support for adult content filtering is provided by the access point 11's service provider network 38 through which the subscriber's traffic will be routed.

However, it should be appreciated that the ANQP server 40 functionality may be incorporated into the access point 11 itself, in which case no external signalling is necessary. This corresponds to step 2 (second part) of FIG. 4.

D. The access point 11 transmits the ANQP response to the mobile device 10 to indicate whether support of adult content filtering is provided by the access point 11's service provider network 38 through which the subscriber's traffic will be routed. This corresponds to step 3 of FIG. 4.

The mobile device 10 uses the information received on adult content filtering to decide whether to associate with the access point 11 or not. If the mobile device 10 wishes to associate with the access point 11 it performs steps E.

E. The mobile device 10 initiates authentication attempt to WLAN AP using 802.1x procedures. This corresponds to step 1 of FIG. 8.

F. The access point 11 forwards authentication request to proxy AAA server 42 using RADIUS/DIAMETER signalling. This corresponds to step 2 of FIG. 8.

G. The Proxy AAA 42 server forwards authentication request to the Home AAA server 13 using RADIUS/DIAMETER signalling.

H. At this point the challenge-and-response procedure similar to that described above in steps L to P of FIGS. 3A and 3B may be performed. However, confirmation of authentication is not yet communicated to the mobile device 10. This corresponds to step 3 of FIG. 8. The Home AAA 13 server queries the HLR/HSS subscription database 94 to validate the authentication request. This corresponds to step 4 of FIG. 8. The Home AAA 13 server identifies if Adult content filtering is active for the subscription. This corresponds to step 5 of FIG. 8.

I. The Home AAA 13 server sends RADIUS/DIAMETER signalling to the proxy AAA server 42 to query for support of adult content filtering support in roaming network 38. This corresponds to step 6 of FIG. 8.

J. The Proxy AAA 42 sends a response indicating support/non-support of Adult content filtering in the roaming network 38. This corresponds to step 7 of FIG. 8. The Home AAA 13 server uses information from Proxy AAA server 42, together with subscription information indicating whether the mobile device 10 is allowed access, to pass/fail authentication request. That is, even if the challenge-and-response authentication is successful, an authentication failed indication will be generated if the content filtering capabilities of the visited service provider 38 do not correspond to the user preferences in the policy service/PCRF 9. This corresponds to step 8 of FIG. 8.

K. The Home AAA server 13 sends authentication response to proxy AAA server 42.

L. The proxy AAA server 42 forwards the authentication response to the WLAN access point 11 in the roaming network 38.

M. The access point 11 forwards the authentication response to the mobile device 10.

Embodiments (1) and (2) can be used independently or together. In particular embodiment (1) has the advantage compared to embodiment (2) that the user device can abort the association with the AP 11 at an earlier stage if the visited network 38 does not support the appropriate level of content filtering. However, embodiment (1) has the disadvantage that compared to embodiment (2) that the user device 10 can be tampered with to circumvent content filtering. Using embodiment (1) and (2) together provides the early abort advantage without the tampering threat.

The invention claimed is:

1. A telecommunications network including:
a mobile device;
a home network with which the mobile device user has a subscription including content filtering preferences, the home network including a content filtering policy preference store for storing the content filtering preferences of the user and a home authentication server for performing authentication of the mobile device; and
a further network having at least one access point with which the mobile device can communicate and a further authentication server for controlling registration of the mobile device with the access point of the further network, and wherein:
the further network is connected to the home network for communication therebetween, and
the further authentication server is operable to communicate with the home authentication server to perform an authentication process for the mobile device when the mobile device connects to the access point of the further network, and the authentication process accesses data from the content filtering policy preference store storing the content filtering preferences of the user, determines whether or not the further network can satisfy the content filtering preferences of the user, and controls registration of the mobile device with the access point of the further network in dependence upon whether the further network can satisfy the content filtering preferences of the user, wherein the authentication process includes the access point sending an authentication request to the further authentication server, after receiving communication from the mobile device, the further authentication server performing a challenge/response procedure to authenticate the mobile device, and the access point receiving a response from the further authentication server, which is forwarded to the mobile device, with the access point and mobile device analysing the response to determine if the response is as expected.

2. The telecommunications network of claim 1, wherein the home authentication server is operable to access the content filtering policy preference store storing the content filtering preferences of the user and to send a query to the further authentication server to determine if the further network is able to satisfy the content filtering preferences, wherein the further authentication server is operable to respond to the home authentication server with an indication of content filtering capabilities of the further network, wherein the home authentication server is operable to determine if the further network can satisfy the content filtering delivery preferences and to instruct the further authenticating authentication server to allow registration of the mobile device with the access point in dependence thereon.

3. The telecommunications network of claim 1, wherein the further authentication server is operable to send an authentication request to the home authentication server and an indication of the content filtering capabilities of the further network, the home authentication server is operable to access the content filtering policy preference store storing the content filtering preferences of the user, to determine if the further network can satisfy the content filtering preferences, and to instruct the further authentication server to allow registration of the mobile device with the access point in dependence thereon.

4. The telecommunications network of claim 1, wherein the home authentication server is operable to access the content filtering policy preference store storing the content filtering preferences of the user and to report the user content filtering preferences to the further authentication server, and the further authentication server is operable to determine if the further network can satisfy the content filtering preferences and to allow registration of the mobile device with the access point in dependence thereon.

5. The telecommunications network of claim 1, wherein the mobile device includes:

a store for storing the content filtering preferences of the user, and a registration controller operable to generate a content filtering query to the further network, and to analyse a response to the content filtering query so as to determine if the further network can satisfy the content filtering preferences and to enable registration with the access point in dependence thereon.

6. The telecommunications network of claim 5, wherein the home network is configured to send the content filtering preferences to the mobile device for storage in the store.

7. The telecommunications network of claim 5, wherein the mobile device is operable to transmit a query to the access point to request an indication of whether the further network can satisfy the content filtering preferences.

8. The telecommunications network of claim 7, wherein the query is an ANQP extension.

9. A mobile device for use in a telecommunications network including a home network with which the mobile device user has a subscription including content filtering preferences of the user, and a further network having at least one access point with which the mobile device can temporarily communicate, the mobile device comprising:

a store for storing the content filtering preferences of the user, and a registration controller operable to generate a content filtering query to the further network, and to analyse a response to the content filtering query so as to determine whether or not the further network can satisfy the content filtering preferences and to enable registration with the access point of the further network in dependence upon whether the further network can satisfy the content filtering preferences of the user, wherein an authentication process includes the access point sending an authentication request to the further authentication server, after receiving communication from the mobile device, a further authentication server performing a challenge/response procedure to authenticate the mobile device, and the access point receiving a response from the further authentication server, which is forwarded to the mobile device, with the access point and mobile device analysing the response to determine if the response is as expected.

10. The device of claim 9, wherein the home network is configured to send the content filtering preferences to the mobile device for storage in the store.

11. The device of claim 9, wherein the mobile device is operable to transmit a query to the access point to request an indication of whether the further network can satisfy the content filtering preferences.

12. The device of claim 11, wherein the query is an ANQP extension.

13. A method of operating a telecommunications network that includes a mobile device, a home network, and a further network, a user of the mobile device having a subscription with the home network that includes content filtering preferences of the user, the home network including a content filtering policy preference store for storing the content filtering preferences and a home authenticating server for performing authentication of the mobile device, the further network having at least one access point with which the mobile device can potentially communicate and a further authenticating server for controlling registration of the mobile device with the access point of the further network, the further network being connected to the home network for communication therebetween, the method comprising:

performing an authentication process for the mobile device via communication between the further authentication server and the home authentication server upon the mobile device connecting to the access point of the further network, and wherein the authentication process comprises:

accessing data from the content filtering policy preference store storing the content filtering preferences of the user;

determining whether or not the further network can satisfy the content filtering preferences of the user; and controlling registration of the mobile device with the access point of the further network in dependence upon whether the further network can satisfy the content filtering preferences of the user;

wherein the authentication process includes the access point sending an authentication request to the further authentication server, after receiving communication from the mobile device, the further authentication server performing a challenge/response procedure to authenticate the mobile device, and the access point receiving a response from the further authentication server, which is forwarded to the mobile device, with the access point and mobile device analysing the response to determine if the response is as expected.

14. The method of claim 13, wherein the mobile device includes a store which stores the content filtering preferences of the user, and a registration controller that generates a content filtering query to the further network and analyses a response to the content filtering query so as to determine if the further network can satisfy the content filtering preferences and to enable registration with the access point in dependence thereon.

* * * * *